Feb. 8, 1955  J. C. TISDALE  2,701,372
ARTIFICIAL LIMB

Filed May 6, 1954  2 Sheets-Sheet 1

Inventor:
Joseph C. Tisdale
By Henry H. Snelling
his Attorney

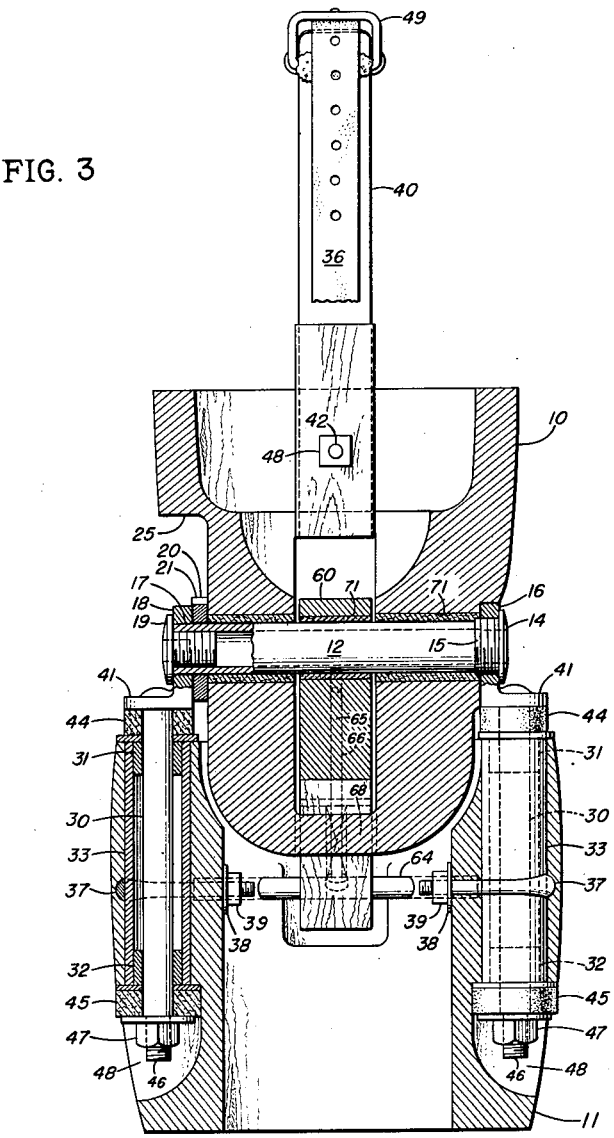

United States Patent Office 2,701,372
Patented Feb. 8, 1955

2,701,372

ARTIFICIAL LIMB

Joseph C. Tisdale, Texarkana, Tex.

Application May 6, 1954, Serial No. 427,952

7 Claims. (Cl. 3—27)

This invention relates to artificial legs for use where the amputation was above the knee. It has for its principal object the provision of an improved knee joint or connection between the thigh member above and the calf or shin member below, so as to provide a sufficient range of knee action to allow for sitting and kneeling while giving a feeling of safety when walking.

A further object of the invention is to provide means for urging the thigh and shin sections into alignment when rising from a sitting position or when moving the artificial leg forward in walking.

A still further object of the invention is to provide a pawl and ratchet mechanism forming a locking device in which the ratchet is fast to the thigh section and the pawl is mounted on a pivot which is movable with the thigh section and guided in the shin section, so that when no pressure is placed on the knee pivot bolt the pawl will move from engagement with the ratch wheel or catch.

In the drawings:

Figure 3 is a rear view;

Figure 1:
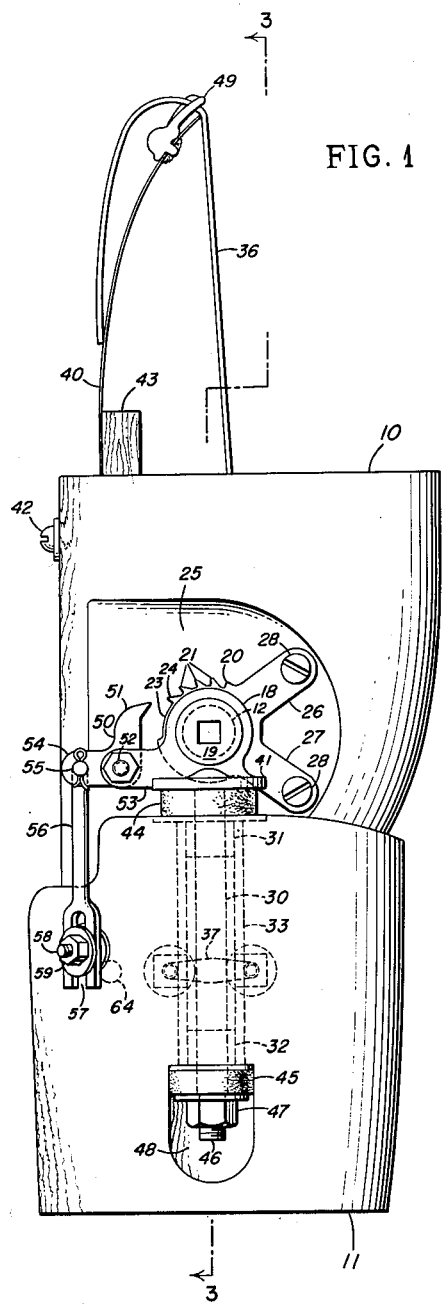
Figure 1 is a side elevation.

The thigh section 10 is pivoted to the shin section 11 by means of the usual knee bolt 12, the permanent head 14 of which is adjacent the threaded neck 15 which preferably has engagement with the internal threads of the bearing lug 16 on one side and the bolt has a smooth snug engagement as at 17 with the opposite bearing lug 18. The smaller and removable head 19 of the bolt 12 has a threaded engagement with the interior of the hollow bolt, which as usual is of sleevelike form. In normal use the bolt 12 does not move, the thigh section 10 pivoting freely on the bolt and carrying a catch member, preferably a ratchet wheel 20 having five or more teeth 21, and a smooth arc portion 23. The thigh section is slabbed as at 25 for a reception of the ratchet wheel plate and its two attaching arms 26 and 27 secured to the thigh section as by the screws 28, if the sections are made of wood and by rivets or similar fasteners if the thigh and shin sections are made of composition or of light metal. As these artificial limbs are almost invariably custom made, the invention will be described in connection with thigh and shin sections made of wood but the claims are to be construed as covering the other materials. Each of the bearing members 16 and 18 is integral with or permanently secured to an elongated vertical post 30 sliding freely in spaced brass bushings 31 and 32 fast within the bored ends of a sturdy aluminum column 33 firmly anchored in the shin section, as for example, by a U-bolt 37 secured by washers 38 and nuts 39 inside of the hollow of the shin section.

Between the base 41 of the bearing 16 or 18 and the top of the column 33 I mount a soft resilient washer 44, which might readily be a light coiled steel spring, either of which allows for considerable relative movement vertically between the knee bolt, the bearings and the posts on one hand and the brass bushings and the shin section on the other hand. The use of a spring is not at all essential as the gravity pull on the shin and leg sections is sufficient to lower the shin section and its permanently secured bushing 31 on the posts 30. A similar washer 45 is positioned between the lower threaded end 46 of the post 30 and the retaining nut 47 easily adjustable in its recess 48 in the shin section. This arrangement permits the post 30 to slide up and down in the bushings 31 to the extent of perhaps 3/16 of an inch, so that when no weight is placed on the knee bolt 12, the spring means 44 holds the column or tube 33 well below the base 41, but when the weight of the user is resting upon the knee bolt 12 the base 41 approaches the column 33 for a purpose to be described later.

The pawl 51 is an integral portion of a lever 50 centrally pivoted as at 52 to a bracket 53 extending laterally from the base 41 of the bearing 18. The free arm 54 of the lever is pivoted as at 55 to an adjusting link 56 having a long slot 57 to be secured by a bolt 58 passing thru the shin section 11, and having a nut 59. The adjusting link 56, by its relative position with respect to the bolt 58 can be raised or lowered so as to correctly position the pawl 51 which when inoperative extends in an approximately vertical position to clear the teeth 21 of the ratchet wheel 20 with the shin section in lowered position. In imposing weight, however, on the thigh section and therefore on the knee bolt 12 the two bearing members 16 and 18, with their posts 30 are lowered with respect to the shin section. This action, since the link 56 is rigid, raises the free end 54 of the lever and this holds the pawl 51 in contact with the ratchet wheel so as to contact either the smooth portion 23, first tooth 24, or any of the other teeth 21 of the ratchet wheel, depending upon the relative positions of the thigh section and the shin sections at the time pressure was placed on the knee bolt.

Figure 2:
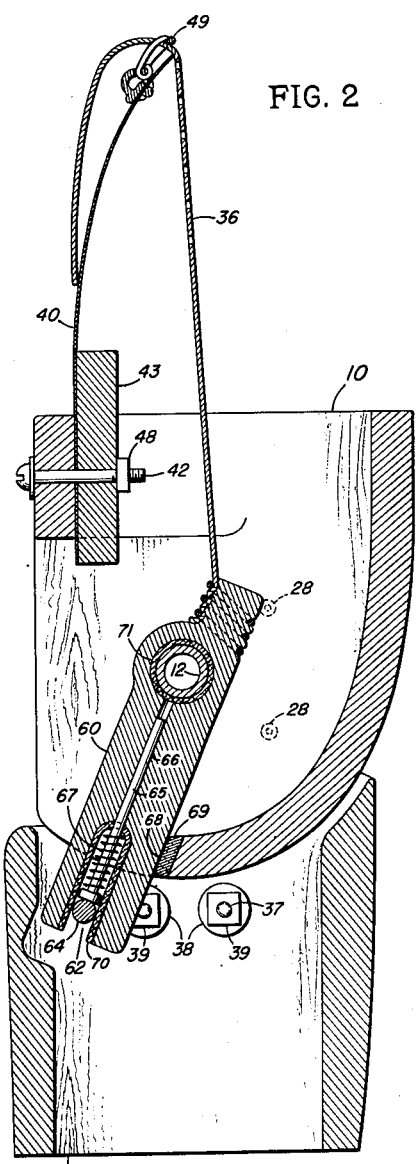
Figure 2 is a central vertical section.

Referring particularly to Figure 2: a spring here shown as a steel leaf spring 40 is secured to the inside of the thigh section as by the bolt 42, the spring being backed by a wooden block 43 against which the nut 48 engages. A buckle 49 is secured to the upper free end of the spring 40 and this adjustably receives a leather strap 36, secured below to one end of the stop member 60 pivoted on the knee bolt 12.

This stop member 60 is quite important as it is the lever action of this member on the spring 40 which gives the desired result. As stated, a spring of any kind attached to the back of the thigh and to the centrally pivoted stop member 60 would give the same action. The stop 60 on the end opposite the attaching of the spring 40 has an elongated slot 62 loosely receiving a pin 64 permanently secured transversely in the thigh member 11, well to the rear thereof. The pin 64 is engaged by a head, spring-pressed member 65 moving freely in a bore 66 in the stop member 60 and constantly pressed outward by the spring 67. The stop member, when the wearer is walking, engages the abutment 68 having the usual cushion 69. As is usual in devices of this kind, the various portions are cushioned for comfort and sometimes to prevent undue wear as, for instance, the leather or rubber covering 70 of the slot 62 and the lining 71 surrounding the knee bolt 12.

It will be understood by those familiar with the art that aluminum plate covers are provided wherever necessary to cover the various parts of the mechanism, and that these covers are omitted in the drawings to make the latter clearer.

In use the pawl 51 is released from the ratchet 20 in taking a step, for example, in walking forward the leg is lifted and the lower portion of the artificial limb is separated from the upper part either by a spring or washer as at 44 or more simply merely by gravity since the posts 30 slide very freely in the bushings 31 and 32 and no matter how made, the lower portion of the limb does have considerable weight, including of course the shin section, the foot section, and the shoe. The movement by gravity or otherwise of the shin section pulls down the end 54 of the lever 50 and this lifts the pawl 51 from the ratchet allowing the knee to bend freely. As the foot touches the ground, however, weight is once more placed on the knee bolt 12 and this immediately lowers the bearings 16 and 18, also the brackets 53. The pivot 55 has relatively no movement at this point and consequently the lever 50 moves freely about its own center pivot 52 and brings the pawl 51 into engagement either between the teeth 21 or on the smooth portion 23 of the ratchet wheel 20 just before the first tooth. With weight on the knee pivot bolt 12, the knee point can move freely through approximately 35° which is ample to provide for normal movement. But the pawl 51 prevents any excess movement and therefore definitely avoids any fear on the part of the user that the joint may give way. He may therefore walk with all confidence, being relieved of the fear of falling.

When the user desires to sit down he obviously takes weight off of the artificial leg. This act immediately causes the column 33 and its bushings to descend with respect to the posts 30 and this moves the pawl 51 out of contact with the ratchet wheel 20 so that the thigh and shin sections may now make an angle of about 90° with each other. When the user is sitting, the pivoted stop member 60 pulls strongly on the leather strap 36 and bows the steel spring 40 about into contact with the far wall of the hollow thigh section 10. At the same time the coiled spring 67 is compressed and when the user desires to rise these two springs 67 and 40 co-operate to urge the leg into straight position. Obviously this relieves the stump of the task of restoring the shin portion, forcing the lower part of the leg forward. The two springs together replace the rollers and the control stops used in previous constructions.

What I claim is:

1. The combination, in an artificial knee joint of a lower limb member, a pair of vertically positioned sleeves anchored in the member, two bearing members each having a post within a sleeve, means yieldingly holding each post within its respective sleeve with the bearing portion out of contact with the top of the sleeve, a knee pivot shaft in said bearings, an upper limb member pivoted on said shaft and having secured thereto a ratchet wheel coaxial with the shaft, a ratchet lever having between its ends a pivot movable up and down with the shaft, a pawl at one end of the ratchet lever, a link pivotally secured to the ratchet lever at the opposite end, adjusting means fixedly secured to the lower limb member at the rear thereof, whereby as the shaft is moved downwardly, carrying with it the ratchet wheel, the link will raise its end of the ratchet lever and cause the pawl end to engage the ratchet wheel to limit relative angular movement of the upper and lower limb members, a horizontal transverse bar in the lower limb member in rear of the sleeves, a forked lever pivoted to the shaft to engage the bar, spring means urging the bar out of the fork, a stop for the forked lever at the bottom of the upper member, and resilient means carried by the forked lever and the upper limb member cooperating with the spring means for increasing the angle between the two limb members when the pawl is free of the ratchet wheel.

2. In an artificial knee joint, a lower or shin member, a pair of bearings resiliently carried by the lower member, a shaft in said bearings, an upper or thigh member movable on said shaft, a two-piece locking device movable with the shaft as the shaft approaches the lower member as weight is transferred from the upper member to the lower member, and means secured to the lower member to engage one piece of the device to lock said piece to the other piece when said weight is so transferred and to disconnect the two pieces when the lower member is freed of such weight.

3. The device of claim 2 in which the means is adjustable and engages the free end of a lever, the other end of said lever being a pawl.

4. In an artificial knee joint joining an upper member to a lower member by a pivot shaft, a lever mounted on the shaft and having a fork at one free end, a main spring secured to the upper member, a connector joining the upper end of the spring to the end of the lever opposite the fork, and a bar secured to the lower member within the fork, whereby when the knee is bent at a right angle as when the wearer in a sitting position, the bar moves the lever about its pivot on the shaft, pulling the connector and placing the main spring under tension, which tension aids in moving the lower member to vertical position when the wearer rises from his sitting position.

5. The device of claim 4 in which a resilient means is positioned within the fork and engages the bar.

6. A knee joint for an artificial limb comprising a shin member having therein a pair of spaced vertical sleeves, a post slidable in each sleeve, a bearing secured to each post, a thigh member, a knee bolt in said bearings pivoting the shin member to the thigh member, a bracket extending from one of the bearings, a pawl lever centrally pivoted to said bracket, a link connecting the pawl lever with the shin member, a stop member carried by the thigh member in the path of the pawl when the posts are lowered in the sleeves, and resilient means for holding the posts elevated in the sleeves when the wearer takes his weight off of the knee pivot bolt.

7. The device of claim 6 in which the link comprises a member pivoted to the free end of the pawl lever and adjustably secured to the shin member.

No references cited.